United States Patent
Dahl et al.

(10) Patent No.: US 12,085,002 B2
(45) Date of Patent: Sep. 10, 2024

(54) METHOD FOR CONTROLLING THE OPERATION OF AN ENGINE SYSTEM

(71) Applicant: VOLVO TRUCK CORPORATION, Gothenburg (SE)

(72) Inventors: Johan Dahl, Gothenburg (SE); Esteban Gelso, Västra Frölunda (SE)

(73) Assignee: VOLVO TRUCK CORPORATION, Gothenburg (SE)

(*) Notice: Subject to any disclaimer, the term of this patent is extended or adjusted under 35 U.S.C. 154(b) by 0 days.

(21) Appl. No.: 18/490,133

(22) Filed: Oct. 19, 2023

(65) Prior Publication Data

US 2024/0133329 A1   Apr. 25, 2024

(30) Foreign Application Priority Data

Oct. 24, 2022 (EP) .................................... 22203281

(51) Int. Cl.
  *F01N 3/20* (2006.01)
  *B01D 53/94* (2006.01)
  (Continued)

(52) U.S. Cl.
  CPC .......... *F01N 3/208* (2013.01); *B01D 53/9431* (2013.01); *B01D 53/9495* (2013.01);
  (Continued)

(58) Field of Classification Search
  CPC ............ B01D 53/9431; B01D 53/9495; B01D 2251/2067; B01D 2257/404; B01D 2258/01; B01D 2259/4566; F01N 3/208; F01N 3/2066; F01N 3/0842; F01N 9/00; F01N 11/00; F01N 2430/02; F01N 2610/02; F01N 2610/146; F01N 2610/03;
  (Continued)

(56) References Cited

U.S. PATENT DOCUMENTS

| 8,978,362 B2 * | 3/2015 | Christner ................. F01N 9/00 60/287 |
| 2014/0208721 A1 * | 7/2014 | Khaled ................... F01N 3/208 73/23.31 |

(Continued)

FOREIGN PATENT DOCUMENTS

| EP | 3289192 B1 | 6/2019 |
| EP | 3452710 B1 | 1/2022 |

(Continued)

OTHER PUBLICATIONS

Extended European Search Report in corresponding European Application No. 22203281.5 dated Apr. 19, 2023 (10 pages).

(Continued)

*Primary Examiner* — Dapinder Singh
(74) *Attorney, Agent, or Firm* — Venable LLP; Jeffri A. Kaminski

(57) ABSTRACT

A computer implemented method for controlling the operation of an engine system in a vehicle is provided. The engine system comprising an engine and an exhaust aftertreatment system for reducing at least NOx emissions of the exhaust gases from the engine using a reductant, the engine system comprising a plurality of engine system components configured to perform a plurality of NOx emission reducing activities.

15 Claims, 4 Drawing Sheets

(51) Int. Cl.
*F02D 41/00* (2006.01)
*F02D 41/02* (2006.01)

(52) U.S. Cl.
CPC ..... *F02D 41/0087* (2013.01); *F02D 41/0235* (2013.01); *B01D 2251/2067* (2013.01); *B01D 2257/404* (2013.01); *B01D 2258/01* (2013.01); *B01D 2259/4566* (2013.01); *F01N 2610/02* (2013.01); *F01N 2900/08* (2013.01); *F01N 2900/12* (2013.01); *F01N 2900/1602* (2013.01); *F02D 2200/0802* (2013.01)

(58) Field of Classification Search
CPC ........... F01N 2570/14; F01N 2560/026; F01N 2560/06; F01N 2900/0402; F01N 2900/0602; F01N 2900/08; F01N 2900/12; F01N 2900/1402; F01N 2900/1602; F01N 2900/1622; F02D 41/0087; F02D 41/0235; F02D 41/1406; F02D 2041/1412; F02D 2041/1433; F02D 2200/0625; F02D 2200/0802; F02D 2250/36; Y02T 10/12; Y02T 10/40

See application file for complete search history.

(56) References Cited

U.S. PATENT DOCUMENTS

| | | |
|---|---|---|
| 2017/0276074 A1 | 9/2017 | Haskara et al. |
| 2017/0306819 A1* | 10/2017 | Alfieri ................... F01N 9/005 |
| 2019/0128163 A1 | 5/2019 | Fritsch et al. |
| 2020/0040795 A1 | 2/2020 | Adi et al. |
| 2020/0063632 A1* | 2/2020 | Hendrickson ......... F01N 3/2066 |

FOREIGN PATENT DOCUMENTS

| | | |
|---|---|---|
| WO | 2016174015 A1 | 11/2016 |
| WO | 2021025875 A1 | 2/2021 |

OTHER PUBLICATIONS

J. Sowman et al: "A Predictive Control Approach to Diesel Selective Catalytic Reduction", 2015 European Control Conference (ECC), EUCA, Jul. 15-17, 2015, pp. 3073-3078, XP032814495, DOI: 10.1109/ECC.2015.7331005; 6 pages.

Mohammed R. Karim et al; "Supervisory Control for Real-Driving Emission Compliance of Heavy-Duty Vehicles"; IFAC PapersOnLine 51-31 (2018); pp. 460-466; 7 pages.

\* cited by examiner

METHOD FOR CONTROLLING THE OPERATION OF AN ENGINE SYSTEM

TECHNICAL FIELD

The present disclosure relates to a method for controlling the operation of an engine system. The present disclosure also relates to a corresponding engine system, a computer program, and a control unit. Although the method and system will be described in relation to a vehicle in the form of a truck, the method and system can also be efficiently incorporated in other vehicle types such as busses, light-weight trucks, passenger cars, construction equipment, marine vessels, and industrial equipment.

BACKGROUND

For a diesel engine a catalytic unit such as a selective catalytic reduction (SCR) device is often used together with a urea dosing system for reducing the emission of hazardous nitrogen oxides such as NO and NO2. More specifically, urea pyrolysis and HNCO hydrolysis converts urea to ammonia, NH3. Ammonia then reacts with hazardous NO and NO2 to produce harmless N2 and H2O inside the selective catalytic reduction device.

It is desirable to maintain tailpipe emissions low, however, to ensure proper engine performance there is a trade-off between emission levels, fuel consumption, and urea consumption.

Accordingly, there is a need for improvements with regards to optimizing the fuel and urea consumptions while respecting engine performance and emission constraints.

SUMMARY

An object of the invention is to provide a method for controlling the operation of an engine system of a vehicle that at least partly alleviates the deficiencies with the prior art. According to the first aspect of the invention, there is provided a computer implemented method for controlling the operation of an engine system in a vehicle, the engine system comprising an engine and an exhaust aftertreatment system for reducing at least NOx emissions of the exhaust gases from the engine using a reductant, the engine system comprising a plurality of engine system components configured to perform a plurality of NOx emission reducing activities, wherein the method comprises the steps of:
  determining the current status of the engine system at least by determining a temperature of the exhaust aftertreatment system;
  determining engine operation preview information as a function of time over a prediction horizon;
  providing a minimization function over the prediction horizon, the minimization function comprising at least the following parameters: NOx tailpipe emission level, fuel utilization level, and urea utilization level,
  determining weight factors at least for the fuel utilization level parameter and the urea utilization level parameter of the minimization function for the prediction horizon,
  retrieving constraints and/or references for at least one of the parameters,
  performing a minimization of the minimization function, subject to the constraints, by tuning at least one set-point of a model adapted to describe relationships between the tunable at least one set-point and the NOx tailpipe emission level, the fuel utilization level, and the urea utilization level, extracting at least one output set point from the minimization step,
  initiating at least one NOx emission controlling activity according to the at least one output setpoint.

The inventors realized to provide a minimization function to optimize the engine system operation to fulfil a tailpipe emission threshold with the lowest possible combined fuel and urea consumption or fuel consumption while respecting several constraints to the system. The proposed method relies on weight factors that indicate the relative importance between the parameters of the minimization function, and the weight factors may be adapted based on several factors. Thus, the weight factors are not necessarily fixed for each sample of the method. When minimizing the minimization function, the output is the resulting set-points for the engine system components that result in the engine out NOx as determined form the parameters of the minimization function. Still, the set-point itself does not need to be explicit engine out NOx it could be another parameter that indirectly affects the NOx such as a set-point of different engine mode or of EGR-fraction in the combustion.

The set-points extracted from the minimization is a sequence of set-point for the entire prediction horizon. In the selection of set-points it is the first set-point of each sequence that is selected, and the remaining consecutive set-points of the sequence are discarded. In other words, a sequence of control actions is calculated over the entire prediction horizon. Only the first control action in the sequence is applied, and the rest of the control sequence is thrown away. Subsequently, the method is again initiated and repeated the step of determining the current status. This methodology is commonly used in Model Prediction Control (MPC).

The current status determined in the initial step is used as a starting point of the prediction horizon for the minimization function. By using the engine operation preview information indicating a predicted or expected use of the engine over the prediction horizon, it is possible to predict the expected need for fuel and urea for the duration of the prediction horizon. With this knowledge, setting constraints on the engine performance, the minimization function provides for resulting set-points that minimizes the fuel consumption while maintaining below tailpipe emission thresholds, such as provided by legal requirements, preferably with a margin.

The engine operation preview information can be determined from GPS data or other map data, and current gear and vehicle speed to provide an estimate of the engine operation preview using e.g., a torque and engine speed model. In addition, determining engine operation preview information may include estimating the preview information only from the present speed and torque and optionally including a present torque gradient and acceleration. For example, the preview information may be that the speed and torque remain the same during prediction horizon as the present speed and torque. Another example is that the preview information assumes the same torque gradient and acceleration as a present torque gradient and acceleration. That is, the engine preview information can be obtained in various ways depending on the available data.

The parameters are typically subject to constraints. For example, the urea utilization level may be subject to upper- and lower-level input constraints, and the engine out NOx may be subject to upper- and lower-level input constraints. Further, the NOx tailpipe emission level may be subject to upper- and lower-level output constraints.

The tuned input or outputs of the model is the output setpoint or input setpoints. During the performance of the minimization the model, input of the model is tuned, where the model describes the tunable input's impact on fuel utilization level, urea utilization level and NOx tailpipe emission level. For example engine out NOx is a tuneable input to the model(s) and in the minimization step the setpoint of engine out NOx is found, The NOx tailpipe emission level may be included in the minimization function in at least two different ways. As one alternative, the NOx tailpipe emission level is subject to a reference, i.e., when minimizing the minimization function, the NOx tailpipe emission level is steered towards a reference level. Stated otherwise, the difference between the NOx tailpipe emission level parameter and the reference is minimized. As another alternative the NOx tailpipe emission level parameter is included as output upper- and lower-level constraints. In other words, the fuel utilization level and the urea utilization level parameters are tuned for minimizing the minimization function subject to the output upper- and lower-level constraints on the NOx tailpipe emission level.

The model adapted to describe relationships between the tunable at least one set-point and the NOx tailpipe emission level, the fuel utilization level, and the urea utilization level may include an engine model, a urea usage model and an exhaust aftertreatment system model. The model(s) may be empirical or even mathematical to describe the relationship between input and output.

The term "NOx" refers to nitrogen oxides.

NOx sensors are commonly used in exhaust gas aftertreatment systems of vehicles and are configured to detect and measure the levels of nitrogen oxides in the exhaust gas. NOx sensors are considered known per se and details about their operation and functionality will not be described in detail herein.

The engine of the vehicle is preferably an internal combustion engine. The internal combustion engine may be diesel engine or a gasoline engine or any other type of internal combustion engine. The internal combustion engine may be part of a hybrid driveline partly powered by a battery. Preferably, the engine is a diesel engine, and the fuel is diesel.

The exhaust aftertreatment system preferably comprises catalytic reduction devices which are devices able to reduce the level of nitrogen oxides in exhaust aftertreatment systems of vehicles. Various types of catalytic reduction devices are per se known and are conceivable options for embodiments of the present invention, and some examples are selective catalytic reduction devices, lean nitrogen oxide traps, hydrogen-carbon selective catalytic reduction devices and a selective catalytic reduction-coated diesel particulate filter. The level of nitrogen oxides may be defined in different ways and is not limited as such. For example, the level of nitrogen oxides may be a relative amount, e.g., a ppm of the total amount of exhaust gas flow, or the level of nitrogen oxides may be nitrogen oxide flow, e.g., measured as mass/unit time, for example, gram/second.

The fuel and urea utilization levels are an efficiency level and may be expressed in various ways, such as amount of fuel or urea per milage e.g., volume per milage or mass per milage, or weight or volume per kWh, by any other reference.

The prediction horizon may be a receding horizon. The engine operation preview information is informative of how the engine is intended to be used over the prediction or receding horizon or window. For example, the engine operation preview information may be predictive of traffic conditions, weather, topology of the road, altitude, gear selection, weight of the vehicle and cargo, etc.

According to an example embodiment, at least one of the weight factors varies across prediction horizon. In one possible implementation each of the weight factors varies across the prediction window. This means that the weights are not constant across the prediction horizon but in fact varies as a function of time over the prediction window. This provides for a more accurate determination of the set-points since the weight factors are allowed to vary according to the engine preview information with basis from the determined current status of the engine.

The method may be operative with a certain sampling time, and the prediction or receding horizon is longer than the sampling time. The weights may still be determined for the entire prediction or receding horizon although a new time-varying set of weights may be determined for the next prediction or receding window in the next sample or cycle of the method. For example, if the horizon is 5 minutes, then the weights may range between several values across the 5 minutes, or generally across the prediction or receding horizon.

According to an example embodiment, the weight factors may be variable over subsequent prediction horizons. In other words, the weight factors may be adapted in case the relative importance between the parameters of the minimization function has shifted. This advantageously provides for an adaptive or responsive method that adapts the NOx emission controlling activity so that the fuel usage is always optimize even if the situation for the vehicle changes.

The variation of the weight factors can depend on different factors or can be adjusted according to different schemes.

In one example embodiment, the weight factors may depend on the engine operation preview information. In other words, once the engine operation preview information is determined, an evaluation of the engine operation preview information with regards to the weights may be performed and an adjustment of the weights according to the outcome of the evaluation may be performed. For example, the engine operation preview information may indicate that for the prediction horizon, a heavy load on the vehicle is required, and in this case the relative importance of the fuel utilization may be adapted to allow for fulfilling the needed torque for the heavy load.

In one example embodiment, the method may comprise adjusting at least one weight factor based on a present efficiency of a catalytic reduction unit of the exhaust aftertreatment system. In other words, the efficiency of the catalytic reduction unit may firstly be analysed whereafter the weight factors may be varied to in case the efficiency has changed.

In still further embodiments, the weights may be variable by input from a user. This may advantageously allow for a fleet owner or user to make manual adaptions that may be used in conjunction with the above more automatic adjustments, or as an override of the automatic adjustments of the weights.

In one example embodiment, the method may comprise predicting a traffic condition for the vehicle during the prediction horizon and adjusting at least one of the weight factors as a function of an altered traffic condition compared to a previous traffic condition. For example, the traffic condition may be predicted from data received from a server collecting data from a plurality of vehicles to analyse congestions, traffic incident reports, roadblocks, or other conditions that may affect the way the vehicle is travelling. Further, GPS or other map data may be used for determining topology, speed, type of road e.g., gravel, asphalt, highway, city roads etc, and other data that may affect the traffic condition of the vehicle over the prediction horizon. As a further example, the ratio between diesel usage and urea usage may also be used to prolong the driving distance before a next refuelling. This way, the weights may be adapted taking into account even further parameters to better minimize fuel consumption.

In embodiments, the NOx emission controlling activity may advantageously include taking actions for adjusting at least one of urea injection, engine out NOx, and a temperature of the exhaust aftertreatment system. The temperature of the exhaust aftertreatment system can be adjusted by for example the temperature of the exhaust gas from the engine, the exhaust mass flow from the engine, but also based on the present power of an electric heater of the exhaust aftertreatment system.

In embodiments, the method may comprise adjusting at least one of: 2-stroke/4-stroke activation and/or deactivation of an engine cylinder, engine on/off, and exhaust aftertreatment system heating, in response to the resulting setpoints. These are some further advantageous NOx emission controlling activity that may be implemented.

In embodiments, the minimization function may be descriptive of overall CO2 emissions as a function of the parameters. Other possible minimization functions are to minimize the amount of fuel such as diesel and urea.

The prediction horizon may depend on the present implementation at hand but a typical prediction horizon may be selected in the range of about 30 seconds to about 20 minutes.

The minimization function is preferably minimized to optimise fuel utilization level, and urea utilization level while fulfilling NOx tailpipe emission level requirements that can either be NOx tailpipe reference and/or NOx tailpipe constraint.

In some embodiments, the step of performing a minimization further includes providing a set-point for the urea utilization. Thus, in addition to providing a set-point for engine out NOx, the method may further advantageously also adapt the set-point for the urea utilization thereby providing a more versatile handle for NOx emission control. The urea is injected by a urea injector that may be arranged upstream of a catalytic reduction device of the aftertreatment system.

According to a second aspect of the invention, there is provided a computer program comprising program code means for performing the steps of the first aspect when the program is run on a computer.

According to a third aspect of the invention, there is provided a computer readable medium carrying a computer program comprising program code means for performing the steps of the first aspect when the program product is run on a computer.

According to a fourth aspect of the invention, there is provided a control unit, the control unit being configured to perform the steps of the method according to the first aspect.

According to a fifth aspect there is provided an engine system for a vehicle, the engine system comprising: an engine; an exhaust aftertreatment system for reducing at least NOx emissions of the exhaust gases from the engine using a reductant; a plurality of engine system components configured to perform a plurality of NOx emission reducing activities; and a control unit according to the fourth aspect.

Effects and features of the second, third, fourth, and fifth aspects are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
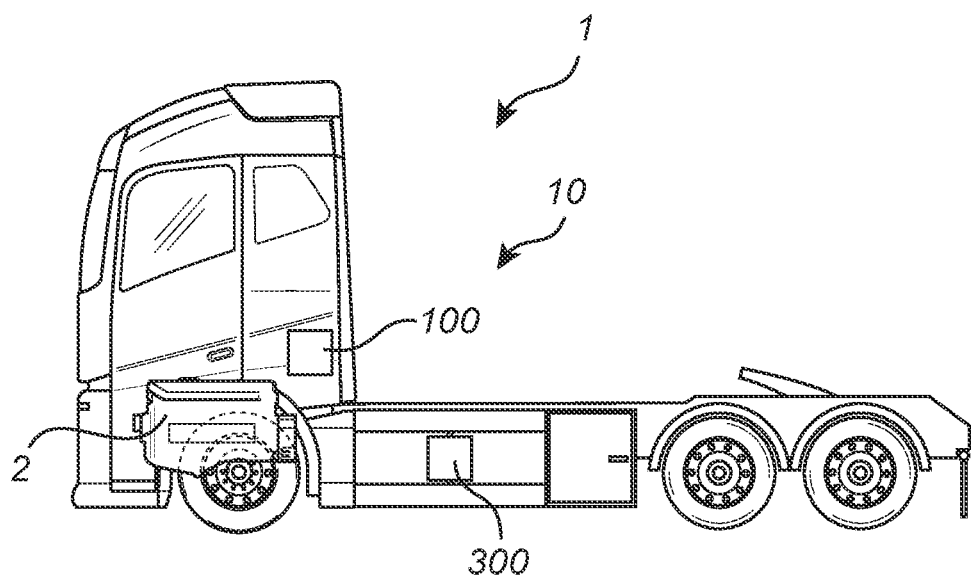
FIG. 1 is a vehicle in the form a truck according to example embodiments of the invention.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. The skilled person will recognize that many changes and modifications may be made within the scope of the appended claims.

Like reference character refer to like elements throughout the description.

FIG. 1 illustrates a vehicle in the form of a truck 1 comprising an engine system 10 for a vehicle comprising engine 2 such as or example an internal combustion engine. The truck 1 further comprises a control unit 100 and an exhaust gas aftertreatment system 300 including catalytic devices such as selective catalytic reduction units. Further, exhaust gas aftertreatment system 300 includes e.g., urea injectors, nitrogen oxide sensors, and often particulate filters. The engine system also includes other engine system components configured to perform a plurality of NOx emission reducing activities. Example NOx emission reducing activities will be discussed further herein.

Figure 2:
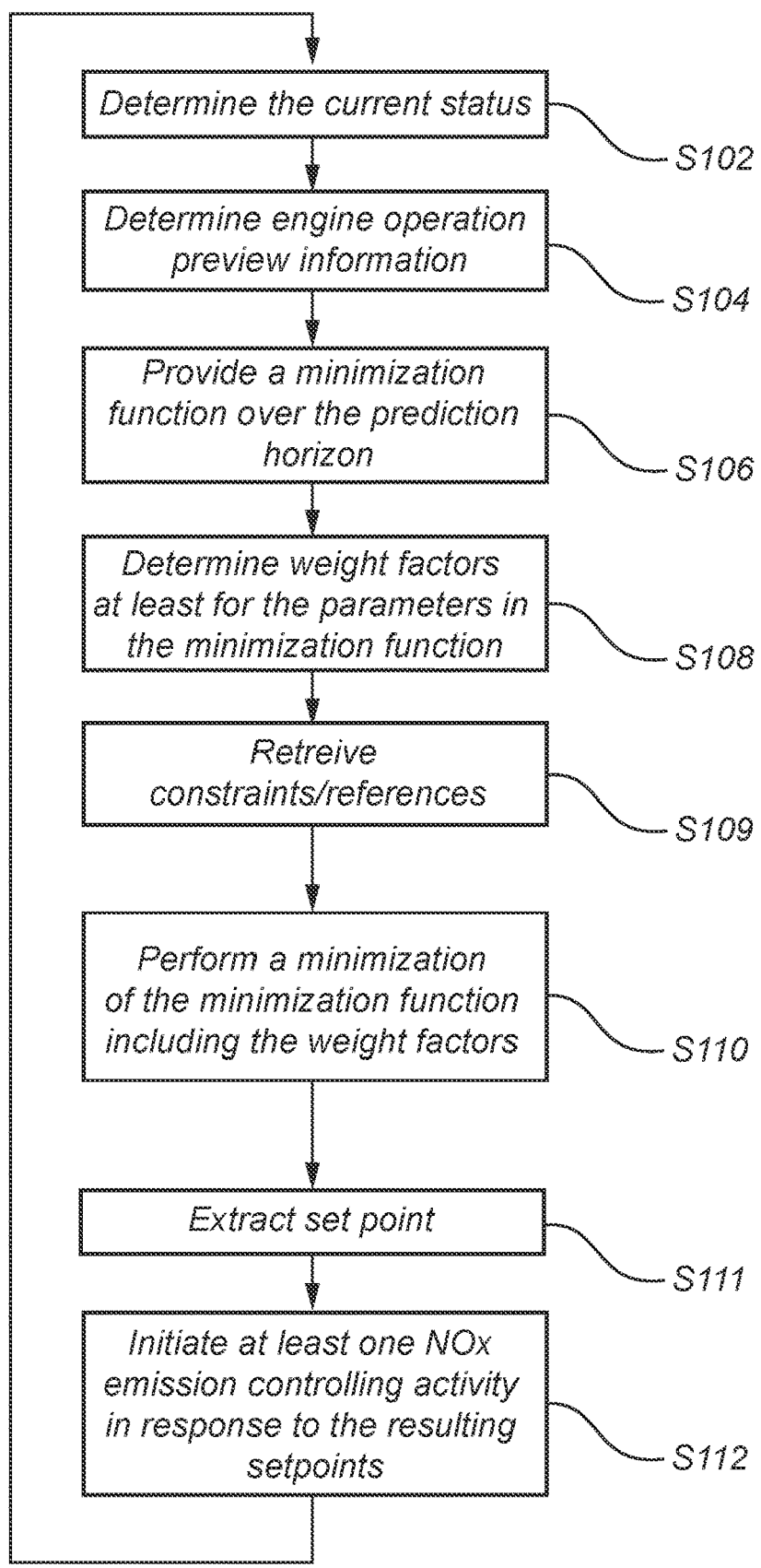
FIG. 2 is a flow-chart of method steps according to example embodiments of the invention.
Figure 3:
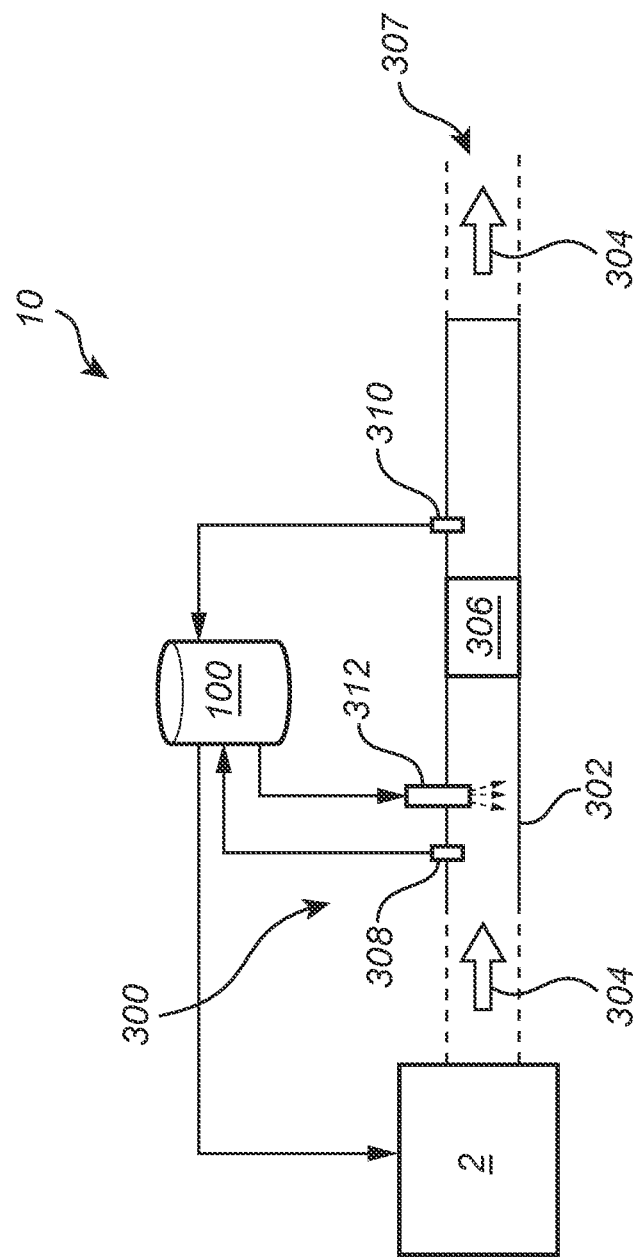
FIG. 3 is a schematic illustration of an engine system according to example embodiments of the invention.

FIG. 2 is a flow-chart of method steps according to embodiments of the invention and FIG. 3 conceptually illustrates an engine system 10 according to embodiments of the invention.

The engine system 10 comprises an exhaust aftertreatment system 300 which comprises an exhaust pipe section 302 for transferring exhaust gas 304 towards an exhaust gas outlet 307. The exhaust pipe section 302 is part of a larger transfer system for transferring exhaust gas from the engine 2 to an exhaust gas outlet 307. The aftertreatment system 300 comprises a catalytic reduction device 306 e.g., a selective catalytic reduction device arranged in the exhaust gas flow for receiving exhaust gas 304. Further, the aftertreatment system 300 comprises a NOx sensor 308 upstream of the catalytic reduction device 306 for measuring inflow levels of NOx to the catalytic reduction device 306. Although not strictly necessary for the present disclosure it is often the case that a second NOx sensor 310 is arranged downstream of the catalytic reduction device 306 for measuring outflow levels of NOx from the catalytic reduction device 306. Generally, an inflow level of NOx is the amount of NOx that enters the catalytic reduction device 306. The outflow level of NOx is the amount of NOx that is left directly downstream of the catalytic reduction device 306. Although not explicitly denoted, the aftertreatment system 300 includes means for, that are controllable by the control unit 100, enabling heating the catalytic reduction device 306, for example, by using engine actuators, by performing a regeneration process, increasing vehicle engine load and speed (e.g., revolutions per minute) by controlling the engine 2, and increasing a pressure across the catalytic reduction device 306 by controlling an outflow throttle of the catalytic reduction device 306.

The control unit 100 may further be configured to control an engine out NOx setpoint, and engine out temperature (constraint or setpoint), and urea flow setpoint or selective catalytic ammonium storage targets for each SCR and electric heated catalyst setpoint.

In addition, the control unit 100 is operatively connected to the engine 2 so that it can control NOx emission controlling activities in the engine such as cylinder deactivation, cylinder compression brake, engine exhaust mass flow, engine out exhaust power, two-stroke or four-stroke combustion demand.

Further, the aftertreatment system 300 comprises a urea injector 312 downstream of the NOx sensor 308 and upstream of the catalytic reduction device 306 and that is configured to inject urea stored in a urea storage in response to control signals from the control unit 100. Although not explicitly illustrated, the aftertreatment system 300 may comprise e.g., ammonia-slip catalysts, diesel oxidation catalyst, particulate filters, exhaust gas temperature sensors, and other components that are per se known to the skilled person and will not be described in detail herein.

Embodiments of the present disclosure relate a computer implemented method for controlling the operation of an engine system 10 in a vehicle 1. The engine system 10 comprises an engine 2 and an exhaust aftertreatment system 300 for reducing at least NOx emissions of the exhaust gases 304 from the engine 2 using a reductant. The engine system comprising a plurality of engine system components 312, 2, 306 configured to perform a plurality of NOx emission reducing activities such that the NOx at the tailpipe outlet 307 is kept low.

According to step S102 of the present disclosure, the control unit 100 is configured to determine the current status of the engine system 10 at least by determining a temperature of the exhaust aftertreatment system 300. The temperature of the exhaust aftertreatment system 300 may be measure by suitable temperature sensors that measure for example the temperature of the catalytic reduction device 306, which may be a selective catalytic reduction device, SCR, or the temperature of the exhaust gas elsewhere in the exhaust aftertreatment system 300, preferably directly downstream of the engine 2, upstream of the SCR 306. In some implementations is also the amount of urea stored in the SCR determined as part of the current status.

Figure 4:
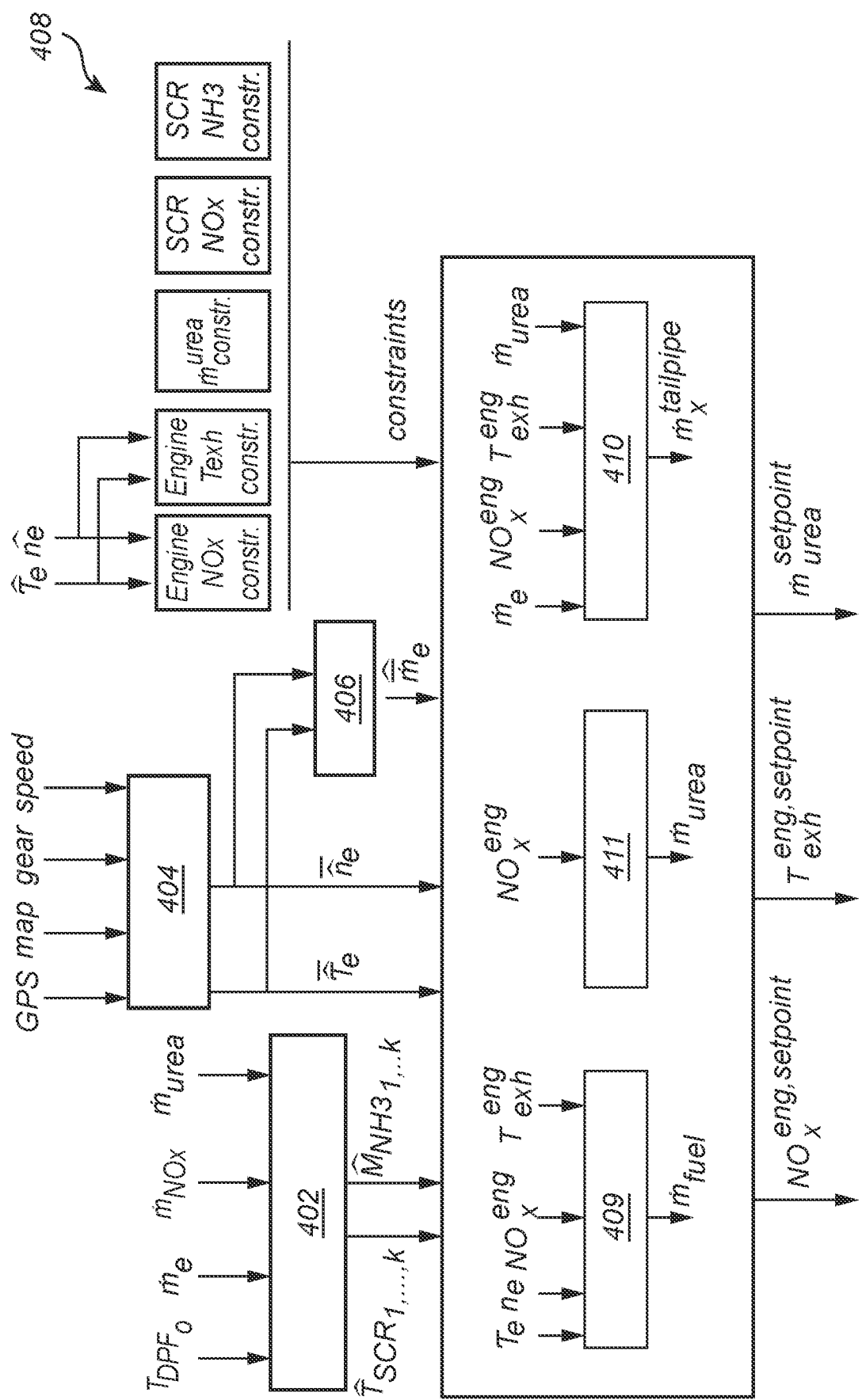
FIG. 4 is a modular overview of embodiments of the invention.

Further, as an alternative to direct measurements, the current status given by a set of internal states, e.g., the above temperature(s) and/or amount of stored ammonia may be estimated from engine and/or exhaust aftertreatment system models as conceptually illustrated in FIG. 4 showing a module overview of the computer implemented method. Here, the EATS model 402 take an exhaust component temperature, such as a particle filter outlet temperature $T_{dpf}$, exhaust mass flow $\dot{m}_e$, NOx mass flow $\dot{m}_{Nox}$ and urea mass flow $\dot{m}_{Urea}$ as input and provide an output including SCR temperature $\hat{T}_{SCR}$ for the prediction horizon, where 1–k indicates different sections of the SCR, and amount of stored ammonia $\hat{M}_{NH3}$ in different sections 1–k. Note that the SCR temperature $\hat{T}_{SCR}$ and amount of stored ammonia $\hat{M}_{NH3}$ may equally well be determined from sensors or sensor fusions. $\bar{\tau}_e$, $\bar{n}_e$ and $\bar{\dot{m}}_e$ are vectors containing the preview of the torque, engine speed and exhaust mass flow.

In step S104, the control unit 100 determines engine operation preview information as a function of time over a prediction horizon. For this, data such as GPS data or other map data and current gear and vehicle speed can provide input for an expected torque and speed model 404 to provide outputs of expected required torque, $\tau_e$, from the engine and speed $n_e$ of the engine (rpm) during a prediction horizon. Then the engine torque and speed model could internally estimate the gear selection and vehicle speed over the prediction horizon in order to calculate the engine speed and torque over the prediction horizon. Even if GPS or other map data may not be available, an estimation of the preview information of the vehicle usage such as torque and engine speed can be determined. An example a relatively simple preview information estimation is to assume the same torque and engine speed as current torque and speed. But other estimations of the preview information based on historical torque and engine speed ($n_e$) can be made.

Further, the engine operation preview information preferably also includes an expected exhaust gas mass flow $\hat{\dot{m}}_e$ which can be estimated form an exhaust gas flow model 406. The prediction horizon is selected in the range of about 30 seconds to about 20 minutes, and in a preferred embodiment the prediction horizon is about 5-10 min. The selection of the prediction horizon depends on several factors, such as the engine dynamics, the aftertreatment dynamics and the legislation of the tailpipe NOx.

In step S106, the control unit 100 is provides a minimization function over the prediction horizon. The minimization function comprising at least the following parameters: NOx tailpipe emission level, fuel utilization level, and urea utilization level. The parameters may be modelled by an engine model 409, a urea usage model 411 and an exhaust aftertreatment system model 410, respectively, On a high level, the minimization function may be given by:

$$\min \sum^{receding\ horizon} W_{Fuel}U_{Fuel} + W_{Urea}U_{Urea} + W_{NOx_{tp}}(NOx_{tp} - NOx_{tp}^{reference})$$

Where $NOx_{tp}$ is the NOx tailpipe emission level, $U_{urea}$ is the urea utilization level, and $U_{Fuel}$ is the fuel utilization level. The W's are the parameters respective weights. Accordingly, in step S108, the control unit 100 is configured to determine weight factors (MW) at least for the parameters in the minimization function for the present prediction horizon. The weight factors may vary across the present prediction horizon. Thus, the weight factors may be non-constant over the present prediction horizon. Over a next prediction horizon, a new set of varying weights may be determined that better reflect a new determined engine preview information.

The weight factors, W, may further be variable over subsequent prediction, or receding, horizons. In other words, the weights Ware determined for a first cycle of the method, and in the next cycle, the weights W may be altered depending on various factors that reflect the present situation for the vehicle, the engine 2 and the exhaust aftertreatment system 300.

In step S108, the control unit 100 receives the constraints and/or references for at least one of the parameters.

According to step S110, the control unit 100 is configured to perform a minimization for the prediction horizon. The minimization is subject to constraints and is performed by tuning at least one set-point of a model adapted to describe relationships between the tunable at least one set-point and the NOx tailpipe emission level, the fuel utilization level, and the urea utilization level. In this example embodiment, it is performed by tuning at least one set-point of the engine model 409, urea usage model 411 and the exhaust aftertreatment system model 410.

In the present embodiment, when minimizing the function, the operation of the engine from the determined current status to the engine operation preview information of the engine is considered for providing resulting set-points from the models 409-411 including at least a set-point directly or indirectly related to engine out NOx. At least one of the parameters is subject to upper-level and lower-level constraints. The minimization function is minimized to optimise fuel utilization level, and urea utilization level while fulfilling NOx tailpipe emission level requirements as provided by a reference and/or constraints. Preferably, the minimization is performed as an optimization over a receding window done by performance index weighted by the weights which are time variant. The optimisation over the receding window is then performed based on the current status and the preview information. In other words, the prediction is not performed for an entire travel route, it is performed for a receding time window or horizon covering the immediate future.

When minimizing the minimization function the parameters are subject to upper-level and lower-level constraints. Thus, the above minimization function is subject to:

engine system model: $x_{k+1} = f(x_k, NOx_{eng}(k), \text{Urea}(k))$ $NOx_{tp}(k) = g(x_k, NOx_{eng}(k), \text{Urea}(k))$ And input constraints:

Min Lim $\leq NOx_{eng} \leq$ Max lim

Min Lim $\leq U_{urea} \leq$ Max lim

And output constraints:

Min Lim $\leq NOx_{tp} \leq$ Max lim with weight $W_{NOx_{tp}Lim}$

Where x is the states in the model f, which is an arbitrary function of $(x_k, NOx_{eng}(k), \text{Urea}(k))$ that describes how the states are updated from sample to sample, g is and arbitrary function of $(x_k, NOx_{eng}(k), \text{Urea}(k))$ describing how NOx_tp depends on $(x_k, NOx_{eng}(k), \text{Urea}(k))$. The output constraints are soft constraints. The constraints together with it's weights are included in the minimization.

The constraints 408, are valid over the prediction horizon and pose constraints such as minimum and maximum of outputs on engine out NOx ($NOx_{eng}$), and NOx tailpipe emission levels, urea utilization, optionally engine out exhaust gas temperature and SCR NOx ($SCR_{NOx}$ in FIG. 4), and stored urea ($SCR_{NH3}$ in FIG. 4). Further constraints may relate to min and max of outputs such as moving average window/Tailpipe NOx ($NOx_{tp}$), and constraints on NH3 slip out of the SCR 306, constraints on tailpipe N20 and N02, and constraints on engine exhaust mass flow.

As an example, the engine model 409 take the torque, $\tau_e$, engine speed (e.g, revolutions per minute) $n_e$, and the set-points $NOx^{eng}$, $T_{exh}^{eng}$ as inputs and estimate fuel utilization level $\dot{m}_{fuel}$. The urea usage model 411 may take the $NOx^{eng}$ as input to model the urea utilization level $\dot{m}_{Urea}$, and the exhaust aftertreatment system model 410, may take the set-points $NOx^{eng}$, $T_{exh}^{eng}$, $\dot{m}_{Urea}$, and the exhaust gas mass flow $\hat{m}_e$ as input to estimate the NOx tailpipe emission level ($NOx_{tp}$). Thus, first inputs to the optimization are provided from the current status, preview information, collectively provided from the models or inputs form 402, 404, and 406, and the constraints. These inputs are used in the models 409-411 together with the tunable set-points $NOx^{eng}$, $T_{exh}^{eng}$, $\dot{m}_{Urea}$ to find the set-points that minimize the minimization function including the constraints.

The minimization may be performing using various methods that are known per se. For example, optimization methods such as dynamical programming, indirect methods, i.e. solution to an NLP problem, multi-linear MPC, LPV MPC, SQP MPC and, direct methods i.e. based on Pontryagins principles.

The output of the minimization is set-points that may be used for affecting the engine out NOx. The set-points are extracted in step S111. Again, during minimization, the set-points ($NOx^{eng}$, $T_{exh}^{eng}$, $\dot{m}_{Urea}$) may be tuned as inputs to the models 409-411 to estimate the parameters in such a way that the weighted parameters, the NOx tailpipe emission level, fuel utilization level, and urea utilization level, estimated from their respective model minimize the minimization function.

The minimization function may be descriptive of overall CO2 emissions as a function of the parameters. Other possible minimization functions are to minimize the amount of fuel such as diesel and urea.

In step S112, the control unit 100 initiates at least one NOx emission controlling activity in response to the resulting setpoints.

The NOx emission controlling activity includes taking actions for adjusting at least one of urea injection via the injector 312, engine out NOx and a temperature of the exhaust aftertreatment system by controlling combustion parameters. Several possible alternatives for controlling the engine are envisage such as adjusting at least one of: 2-stroke/4-stroke activation and/or deactivation of an engine cylinder, engine on/off, and exhaust aftertreatment system heating, in response to the resulting setpoints. Other envisaged implementations include controlling cylinder deactivation, cylinder compression brake, engine exhaust mass flow, engine out exhaust power, two-stroke or four-stroke combustion demand. Additionally, the weight may be changed over the receding horizon to capture for example the impact of an uphill occurring in the receding horizon.

Subsequent to step S112, the computer implemented method is reinitiated at step S102.

It is preferred that the weights are time variant. In other words, for each sample or cycle, the weight factors are re-calculated and may thus change depending on various circumstances so that the relative importance between the parameters of the minimization function can be adapted to better fit the present situation, e.g., the current status of the engine system and/or the engine operation preview information for the next receding horizon. To fully take advantage of the engine operation preview information, the weights may be time-variant over the present prediction or receding window.

In one possible implementation, the control unit 100 adjusts at least one weight factor based on a present efficiency of a catalytic reduction unit 306 of the exhaust aftertreatment system 300. For example, if the SCR efficiency have degraded then the weight factors for urea and fuel may change to result in lower engine our NOx demand.

In one possible implementation, the control unit 100 is configured to predict a traffic condition for the vehicle 1 during the prediction horizon and adjust at least one of the weight factors as a function of an altered traffic condition compared to a previous traffic condition. It is also envisaged that the weights are variable by input from a user. For example, to allow the owner to update the weights for fuel and urea utilization based on the change of price level of fuel and urea.

The control of the aftertreatment system and means thereof for executing the method described herein is performed by a control unit onboard the vehicle.

A control unit may include a microprocessor, microcontroller, programmable digital signal processor or another programmable device. Thus, the control unit comprises electronic circuits and connections (not shown) as well as processing circuitry (not shown) such that the control unit can communicate with different parts of the truck such as the brakes, suspension, driveline, in particular an electrical engine, an electric machine, a clutch, and a gearbox in order to at least partly operate the truck. The control unit may comprise modules in either hardware or software, or partially in hardware or software and communicate using known transmission buses such as CAN-bus and/or wireless communication capabilities. The processing circuitry may be a general-purpose processor or a specific processor. The control unit comprises a non-transitory memory for storing computer program code and data upon. Thus, the skilled addressee realizes that the control unit may be embodied by many different constructions.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

It is to be understood that the present invention is not limited to the embodiments described above and illustrated in the drawings; rather, the skilled person will recognize that many changes and modifications may be made within the scope of the appended claims.

The invention claimed is:

1. A computer implemented method for controlling the operation of an engine system in a vehicle, the engine system comprising an engine and an exhaust aftertreatment system for reducing at least NOx emissions of the exhaust gases from the engine using a reductant, the engine system comprising a plurality of engine system components configured to perform a plurality of NOx emission reducing activities, wherein the method comprises the steps of:
   determining the current status of the engine system at least by determining a temperature of the exhaust aftertreatment system;
   determining engine operation preview information as a function of time over a prediction horizon;
   providing a minimization function over the prediction horizon, the minimization function comprising at least the following parameters: NOx tailpipe emission level, fuel utilization level, and urea utilization level,
   determining weight factors at least for the fuel utilization level parameter and the urea utilization level parameter of the minimization function for the prediction horizon,
   retrieving constraints and/or references for at least one of the parameters,
   performing a minimization of the minimization function, subject to the constraints, by tuning at least one set-point of a model adapted to describe relationships between the tunable at least one set-point and the NOx tailpipe emission level, the fuel utilization level, and the urea utilization level,
   extracting at least one output set point from the minimization step,
   initiating at least one NOx emission controlling activity according to the at least one output setpoint.

2. The method according to claim 1, wherein the weight factors are variable over subsequent prediction horizons.

3. The method according to claim 1, wherein at least one of the weight factors varies across prediction horizon.

4. The method according to claim 3, wherein the weight factors depend on the engine operation preview information.

5. The method according to claim 3, comprising adjusting at least one weight factor based on a present efficiency of a catalytic reduction unit of the exhaust aftertreatment system.

6. The method according to claim 3, wherein the weights are variable by input from a user.

7. The method according to claim 3, comprising predicting a traffic condition for the vehicle during the prediction horizon, and adjusting at least one of the weight factors as a function of an altered traffic condition compared to a previous traffic condition.

8. The method according to claim 1, wherein the NOx emission controlling activity includes taking actions for adjusting at least one of urea injection, engine out NOx, and a temperature of the exhaust aftertreatment system.

9. The method according to claim 1, comprising adjusting at least one of: 2-stroke/4-stroke activation and/or deactivation of an engine cylinder, engine on/off, and exhaust aftertreatment system heating, in response to the resulting setpoints.

10. The method according to claim 1, wherein the minimization function is descriptive of overall CO2 emissions as a function of the parameters.

11. The method according to claim 1, wherein the prediction horizon is selected in the range of about 30 seconds to about 20 minutes.

12. A computer program comprising program code for performing the steps of claim 1 when said program is run on a computer.

13. A non-transitory computer readable medium carrying a computer program comprising program code for performing the steps of claim 1 when said program code is run on a computer.

14. A control unit for operation of an engine system in a vehicle, the control unit is configured to perform the steps of the method according to claim 1.

15. An engine system for a vehicle, the engine system comprising:
  an engine;
  an exhaust aftertreatment system for reducing at least NOx emissions of the exhaust gases from the engine using a reductant;
  a plurality of engine system components configured to perform a plurality of NOx emission reducing activities; and
  a control unit according to claim 14.

* * * * *